US012734911B2

(12) United States Patent
Cook

(10) Patent No.: US 12,734,911 B2
(45) Date of Patent: Sep. 15, 2026

(54) DYNAMIC WIRELESS POWER TRANSFER SYSTEM CONTROLLING MULTIPLE TRANSMITTER COILS

(71) Applicant: Dynamic WPT LLC, Fullerton, CA (US)

(72) Inventor: David Cook, Fullerton, CA (US)

(73) Assignee: Dynamic WPT LLC, Fullerton, CA (US)

( * ) Notice: Subject to any disclaimer, the term of this patent is extended or adjusted under 35 U.S.C. 154(b) by 758 days.

(21) Appl. No.: 18/041,502

(22) PCT Filed: Aug. 13, 2021

(86) PCT No.: PCT/US2021/045979
§ 371 (c)(1),
(2) Date: Feb. 13, 2023

(87) PCT Pub. No.: WO2022/036244
PCT Pub. Date: Feb. 17, 2022

(65) Prior Publication Data

US 2023/0302927 A1 Sep. 28, 2023

Related U.S. Application Data

(60) Provisional application No. 63/065,256, filed on Aug. 13, 2020.

(51) Int. Cl.
*H02J 7/00* (2026.01)
*B60L 53/126* (2019.01)
(Continued)

(52) U.S. Cl.
CPC ............. *B60L 53/126* (2019.02); *B60L 53/38* (2019.02); *B60L 53/39* (2019.02); *H02J 50/10* (2016.02); *H02J 50/402* (2020.01); *H02J 50/90* (2016.02)

(58) Field of Classification Search
CPC ........ B60L 53/126; B60L 53/38; B60L 53/39; H02J 50/10; H02J 50/402; H02J 50/90
(Continued)

(56) References Cited

U.S. PATENT DOCUMENTS

2014/0174870 A1* 6/2014 Niizuma ................. B60L 53/32 191/10
2015/0298561 A1* 10/2015 Keeling ................. B60M 7/003 191/10
(Continued)

FOREIGN PATENT DOCUMENTS

CN 107813729 A * 3/2018 ............. B60L 53/38

*Primary Examiner* — Zixuan Zhou
(74) *Attorney, Agent, or Firm* — K&L Gates LLP

(57) ABSTRACT

A wireless power transfer system for a vehicle traveling along a surface is provided. The wireless power transfer system includes a receiver coil mounted to the vehicle; a plurality of transmitter units connected in series and positioned on the surface; and a controller in communication with voltage sensors of each transmitter unit. The transmitter units include inactive and active transmitter units, and the inactive transmitter units include a leading transmitter unit and a trailing transmitter unit adjacent to the active transmitter units. The controller is configured to receive voltages of the leading and trailing transmitter units, compare the voltages with data in the database, and determine a position of the receiver relative to the transmitter units in order to activate and deactivate transmitter units as needed to dynamically modify the subset of active transmitter units to provide an efficient and smooth power supply to the receiver.

18 Claims, 3 Drawing Sheets

(51) Int. Cl.
*B60L 53/38* (2019.01)
*B60L 53/39* (2019.01)
*H02J 50/10* (2016.01)
*H02J 50/40* (2016.01)
*H02J 50/90* (2016.01)

(58) Field of Classification Search
USPC ..................... 320/108, 109; 307/104; 701/22
See application file for complete search history.

(56) References Cited

U.S. PATENT DOCUMENTS

2016/0023557 A1* 1/2016 Dimke .................... B60L 53/36
320/108
2016/0072299 A1* 3/2016 Huang .................... B60L 50/16
307/104
2016/0178740 A1* 6/2016 Sieber ..................... B60L 53/36
342/43
2022/0072965 A1* 3/2022 Mazaki ................. B60L 53/122

* cited by examiner

DYNAMIC WIRELESS POWER TRANSFER SYSTEM CONTROLLING MULTIPLE TRANSMITTER COILS

CROSS-REFERENCE TO PREVIOUS APPLICATIONS

The present application is a national stage entry of International Application No. PCT/US21/45979, filed Aug. 13, 2021 and claims priority to U.S. Provisional Application No. 63/065,256, filed Aug. 13, 2020, the entirety of which is hereby incorporated.

BACKGROUND OF THE INVENTION

The present subject matter relates generally to inductive power transfer for mobile systems. More specifically, the present subject matter relates generally to inductive power transfer for mobile systems on fixed guideways such as rail vehicles or rubber tired vehicle that operate in fixed lanes.

U.S. Pat. No. 10,473,012 discloses a wireless power transfer system that uses a single long vehicle-mounted receiver coil designed to receive power from multiple active transmitter units embedded in the track or surface below the vehicle. The receiver coil moves along a long row of transmitter units, turning on a leading transmitter coil as the receiver coil passes above and turning off the final transmitter coil that became uncovered by the receiver coil. The system acts as if there is a virtual single transmitter moving along with the receiver.

Accordingly, there is a need for systems and methods of sensing the position of the receiver in relation to the transmitters as part of the control system that turns on and off the transmitters.

BRIEF SUMMARY OF THE INVENTION

To meet the needs described above and others, the present disclosure provides systems and methods for monitoring voltage changes in transmitter units as the receiver coil passes over the transmitter coils of the transmitter units, activating and deactivating transmitter coils in response thereto. By monitoring voltage changes in the transmitter units, the wireless power transfer (WPT) system determines the position of the receiver relative to the transmitter units and can efficiently activate and deactivate transmitter coils as needed.

The WPT system of the present application includes a receiver coil mounted to an underside of a vehicle, such as a locomotive. A plurality of transmitter units is embedded into a track, road, or path along which the vehicle travels. The receiver coil on the vehicle activates a subset of transmitter coils directly below the receiver coil, and the remaining transmitter coils that are not located under the receiver coil are inactive. As the vehicle moves along the track, the transmitter units within the activated subset of transmitter units changes in response to the movement of the vehicle. Further, a number of locomotives may be equipped with receiver coils on the undersides thereof, and different subsets of active transmitter units within the serially-connected transmitter units embedded in the track provide power to more than one receiver coil at a given time.

Each transmitter coil is mounted to a transmitter unit that is connected to a power supply, a controller, and adjacent transmitter units in series. A high frequency power supply provides power to the series of transmitter units through two transmission power lines. A jumper or electrical wire connects the electrical components of adjacent transmitter units. In other embodiments, transmitter units are not connected through a jumper wire. Each transmitter unit also includes a voltage sensor to monitor the voltage of the attached transmitter coil.

In each transmitter unit, first and second switches enables the respective first and second ends of the attached transmitter coil to connect to the respective first and second transmission power lines, and a third switch enables each transmitter unit to connect to the next transmitter unit in series. Each transmitter unit is connected to a controller through a communications wire to enable the controller to control the first, second, and third switches. In one embodiment, each transmitter unit includes a resonating network of capacitors and inductors and an inverter that provides synchronized alternating current (AC) wave form to each transmitter unit in the subset of active transmitter units.

During use, as the vehicle moves along the path of embedded transmitter units, the receiver coil receives power from the subset of active transmitter coils positioned below the vehicle. The WPT system adds the next subsequent inactive transmitter unit, or "leading" transmitter unit, to the subset of active transmitter units as the receiver moves in the direction of the leading transmitter unit. At the same time, the WPT system deactivates the active transmitter unit in the subset of active transmitter units farthest from the leading transmitter unit, the "final" active transmitter unit. In addition to monitoring the voltage of the leading transmitter unit, the WPT system monitors the voltage of the first inactive transmitter unit after the subset of active transmitter units, or the "trailing" transmitter unit. The receiver coil is positioned above the inactive trailing transmitter unit and therefore induces a voltage therein, and as the receiver coil moves past the trailing transmitter unit, reducing coverage thereof, the voltage within the respective transmitter coil decreases. The WTP system activates and deactivates the leading transmitter unit and the last transmitter unit in the subset of active transmitter units based on the voltage information from the leading and trailing transmitter units in order to provide a smooth transition as the subset of active transmitter units changes and to minimize oscillation within the system.

Each of the three switches in each inactive transmitter unit is open, preventing power from being supplied to the coil and preventing the transmitter unit from connecting with the adjacent transmitter unit. When the leading transmitter unit is activated, the first switch is closed, enabling power to pass through the first end of the attached transmitter coil. The second switch remains open and the third switch is closed, preventing power from flowing out of the transmitter coil into the second power transmission line and instead directing power to flow to the next transmitter unit in the subset of active transmitter units. The first switch of the transmitter unit next in series is opened so that the respective transmitter coil receives power from the newly activated leading transmitter unit instead of the first power transmission line.

Within each active transmitter unit between the leading and trailing transmitter units, the transmitter units in series are electrically connected as each third switch is closed. The first and second switches remain open so that power does not flow into the first or second power transmission lines. The transmitter coils attached to each transmitter unit between the leading and trailing transmitter units receive power via the jumper wires.

In the last transmitter unit of the serially connected subset of active transmitter units, the first and third switches are open and the second switch is closed, allowing power to move through the attached transmitter coil to the second power transmission line. The open third switch disconnects the transmitter unit from the next transmitter unit in series, the trailing transmitter unit. In the trailing transmitter unit, each of the three switches is open, similar to all inactive transmitter units, preventing power from being supplied to the coil and preventing the transmitter unit from connecting with the adjacent transmitter unit.

The long receiver coil partially overlaps the leading and trailing transmitter units, attempting to induce a current in the leading and trailing inactive transmitter units when energized by the adjacent active transmitters. While an inactive transmitter will not allow current to flow through when energized by the receiver coil, it will generate a voltage rise. By monitoring the change in voltage between the leading and trailing inactive transmitter units, the WPT system can determine a location of the receiver coil relative to the leading and trailing inactive transmitter units.

If the WPT system detects the same voltage induced in the leading and trailing inactive transmitter units, the receiver is centered between the leading and trailing inactive transmitter units. If one of the leading and trailing inactive transmitter units has a higher voltage, then the receiver coil is covering a higher percentage of the transmitter unit having a higher voltage.

By comparing these voltages over time and observing if one transmitter voltage is increasing or decreasing, the system can determine the direction in which the receiver is moving. By observing how rapidly that change is happening, i.e. the rise and drop in voltage over time, the WTP system can determine how quickly the receiver is moving.

Once the position and direction of the receiver is determined, the WTP system identifies the leading transmitter unit to activate. The WTP can determine how quickly or when to activate the leading transmitter unit and how quickly and when to deactivate the last active transmitter unit in the subset of active transmitter units, adjacent to the trailing transmitter unit, based on the direction, position, and timing of the receiver coil as it moves along the transmitter units, thereby achieving dynamic wireless power transfer.

In one embodiment, all third switches in the transmitter units are closed or replaced with permanent jumper wires, and the WPT system uses only the first and second switches to activate and deactivate the subset of active transmitter units of the serially connected transmitter coils. While this embodiment uses fewer components by eliminating the third switch for each transmitter unit, eliminating the third switch may result in all coils oscillating in voltage even when current is not flowing through them.

In one embodiment, the WPT system monitors the voltage differential between the leading and trailing transmitter units. The controller is preprogrammed with a threshold voltage differential for activating and deactivating transmitter coils. The controller receives a leading voltage from the leading transmitter unit and a trailing voltage from the trailing transmitter unit and determines a voltage differential. When the absolute value of the voltage differential is above the threshold voltage differential, the controller activates the leading transmitter unit and deactivates the last transmitter unit in the subset of active transmitter units.

In some embodiments, the threshold voltage differential is a set value. In other embodiments, the threshold voltage differential is a percentage of a nominal voltage of an active coil.

The polarity of the voltage differential indicates the direction in which the vehicle is moving as well as which of the inactive transmitter units next to the subset of active transmitter units is the leading transmitter unit and which is the trailing transmitter unit.

An objective of the present invention is to provide a system for monitoring transmitter coil usage and/or voltage and smoothly activate and deactivate transmitter coils to minimize disruption to the system.

An advantage of the present invention is that by monitoring voltage of the transmitter coils, no additional sensors, hardware, or other components are needed to provide the increased control.

Additional objects, advantages, and novel features of the solutions provided herein will be recognized by those skilled in the art based on the following detail description and claims, as well as the accompanying drawings, and/or may be learned by production or operation of the examples provided herein.

BRIEF DESCRIPTION OF THE DRAWINGS

The figures depict one or more embodiments of the subject matter described herein. They are provided as examples only. Within the figures, reference numbers are used to refer to elements described in the detailed description.

DETAILED DESCRIPTION OF THE INVENTION

Figure 1:
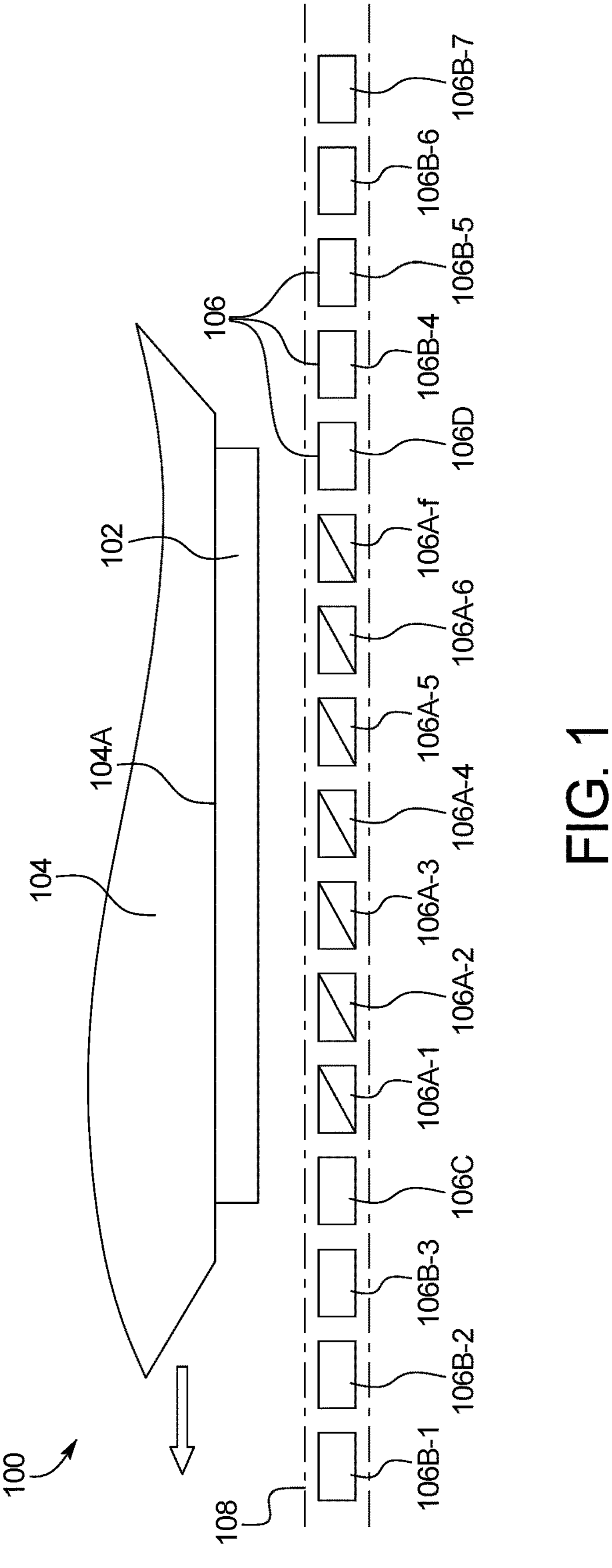
FIG. 1 is a diagram of a wireless power transfer topology of the present application.

FIGS. 1-4 illustrate a wireless power transfer (WPT) system 100 that utilizes a receiver 102 mounted to a moving vehicle 104 that receives power from a set of transmitter units 106 embedded in the surface 108 on which the vehicle 104 moves. More specifically, the receiver 102 is mounted to the underside 104A of vehicle 104 which travels along a trail, track, path, or other course 108 in which the transmitter units 106 are embedded. In rail applications, the top surfaces of transmitter units 106 are flush with or below the top surface of the rail 108. For systems in use with rubber tired vehicles, the transmitters 106 could be on top of or flush with the road surface 108.

Referring to FIG. 1, the vehicle 104 is moving from right to left as indicated by the direction arrow, and the set of transmitter units 106 includes a subset of active transmitter units 106A positioned under the receiver 102 on the vehicle 104 and a remaining set of inactive transmitter units 106B. In the illustrated embodiment, the subset includes seven active transmitter units 106A, although there could also be a higher or lower number of active units depending on system design. During use, transmitter units 106 are added to and removed from the subset of active transmitter units 106A as the vehicle 104 moves along the surface 108.

In FIG. 1, the transmitter unit 106C next to be added to the subset of transmitter units 106A, the "leading" transmitter unit 106C, transitions from inactive to active as the receiver 102 moves left, approaching and passing above the leading transmitter unit 106C. The first inactive transmitter unit 106 after the subset of active transmitter units 106A in series is the "trailing" transmitter unit 106D. The WPT system 100 deactivates the active transmitter unit 106A in the subset of active transmitter units 106A farthest from the leading transmitter unit 106C, the "final" active transmitter unit 106A-f.

The receiver 102 has a length that is greater than a length of the subset of active transmitter unit 106A. In one embodiment, the receiver 102 has a length that is approximately 5.5 times the length of a single transmitter unit 106. In one example embodiment, the receiver 102 may have a length of 8 feet, a width of 33 in, and have a 4 in ground clearance while each transmitter unit 106 has a length of approximately 17.5 in and a width of 33 in. At this proportion, when the receiver coil 114 is centered on the subset of active transmitter units 106A, the receiver coil 114 covers 75% of each of the leading and trailing transmitter units 106C, 106D.

As the receiver 102 continues along the path of embedded transmitter units 106, the receiver 102 transitions to covering 100% of the leading transmitter unit 106C and 50% of the trailing transmitter unit 106D. Activating and deactivating transmitter coils 106 and movement of the receiver coil 102 can cause power oscillations, and providing for a smoothly transitioning coverage of both the leading and trailing inactive transmitter units 106C, 106D prevents or minimizes such oscillations. In other embodiments, a different ratio of receiver coil length to subset of active transmitter unit length is used and programmatic approaches to detect and prevent oscillations are utilized.

The WPT system 100 of the present application monitors the induced voltages of the leading and trailing transmitter units 106C, 106D to determine the relative position, direction of travel, and velocity of the receiver 102 along the surface 108 and to enable the system 100 to efficiently add and remove transmitter units 106 to and from the subset of active transmitter units 106A. For example, when over 60% of the trailing transmitter unit 106D is covered by the receiver 102 and only 10% of the leading transmitter unit 106C is covered, the trailing transmitter unit 106D has a greater voltage that is decreasing, and the leading transmitter unit 106C has a lower voltage that is increasing. The WPT system 100 detects voltage changes in the leading and trailing transmitter units 106C, 106D and determines the position of the receiver 102 relative thereto.

An increase in the induced voltage of a transmitter unit 106 indicates that the receiver 102 is moving towards it. The WPT system 100 can then prepare to activate the leading transmitter unit 106C and simultaneously deactivate the last active transmitter unit 106A-f in the subset of active transmitter units 106A adjacent to the trailing transmitter unit 106D, as the subset of active transmitter units 106A changes with the movement of the receiver 102.

It should be noted that in the WPT system 100 described above, the detection of the voltage changes of the transmitter units 106, the determination of the position of the receiver 102, the activating and deactivating of the transmitter units 106, and other steps described herein are carried out on a controller 110 including a memory 113. The controller 110 is in communication with the database 112, which can be located within the controller 110, connected to the controller 110 through a wired connection, or remote from the controller 110 and accessed through a wireless connection. Programmable instructions on the memory 113 enable the controller 110 to implement programs, procedures, or modules to provide the functionality of the WTP system 100 described herein.

Further, each transmitter unit 106 includes a voltage sensor 111 as described below. Over time, the WPT system 100 collects data from the voltage sensors 111 of each transmitter unit 106 and populates a database 112 in which an induced voltage of a transmitter unit 106 is correlated to a surface area of the transmitter unit 106 covered by the receiver 102. During use, the controller 110 is configured to detect the induced voltage of the leading and trailing transmitter units 106C, 106D, reference the database 112 to determine the amount of surface area covered by the receiver 102, and then determine a position of the receiver 102 over the respective transmitter unit 106.

With respect to leading transmitter unit 106C, the controller 102 is then able to determine the remaining distance that is yet to be traveled by the receiver 102 in order to cover the leading transmitter unit 106C such that the leading transmitter unit 106C is ready to be activated. Similarly, in the case of trailing transmitter units 106D, the controller 102 is able to determine the remaining distance that is yet to be traveled by the receiver 102 in order to uncover the trailing transmitter unit 106D such that the last transmitter unit 106A-f of the subset of active transmitter units 106A is ready to be deactivated.

The WPT system 100 can also monitor the rate at which the induced voltage is increasing in order to determine the speed of the receiver 102 over the transmitter units 106. Using the speed of the receiver 106 and the position of the receiver 102 relative to the leading and trailing transmitter units 106C, 106D, the WPT system 100 can anticipate when to update the subset of active transmitter units 106A.

In some embodiments, the controller 110 monitors a leading voltage of the transmitter coil 116 of the leading transmitter unit 106C and activates the unit 106C when the leading voltage reaches a minimum threshold value. Similarly, the controller 110 monitors a trailing voltage of the transmitter coil 116 of the trailing transmitter unit 106D and deactivates the last active transmitter unit 106A-f of the subset of active transmitter units 106A next to the trailing transmitter unit 106D when the trailing voltage of the trailing transmitter unit 106D drops below a minimum threshold value.

In another embodiment, the WTP system 100 may activate the leading transmitter unit 106C or deactivate the final active transmitter unit 106A-f of the subset of active transmitter units 106A when the receiver 102 covers a threshold surface area of the leading and/or trailing transmitter units 106C, 106D. For example, the WTP system 100 may deactivate the last active transmitter unit 106A-f when the receiver 102 covers less than 25%, or less than 15% in a preferred embodiment, of the surface area of the trailing transmitter unit 106D. The controller 110 receives the leading or trailing voltage, references the database 112 that correlates voltage to surface area coverage to determine a surface area of the leading or trailing transmitter unit covered by the receiver, and activates or deactivates the appropriate transmitter unit when the surface area is greater than or less than, respectively, the threshold surface area.

In still other embodiments, the WPT system 100 monitors the voltage differential between the leading and trailing transmitter units 106C, 106D. The controller 110 is preprogrammed with or receives from the database 112 a threshold voltage differential for activating and deactivating transmitter coils 116. The controller 110 receives a leading voltage from the leading transmitter unit 106C and a trailing voltage from the trailing transmitter unit 106D, and determines a voltage differential. When the absolute value of the voltage differential is above the threshold voltage differential, the controller 110 activates the leading transmitter unit 106C and deactivates the last transmitter unit 106A-f in the subset of active transmitter units 106A.

In some embodiments, the threshold voltage differential is a set value. In other embodiments, the threshold voltage differential is a percentage of a nominal voltage of an active coil.

The polarity of the voltage differential indicates the direction in which the receiver 102 is moving as well as which of the inactive transmitter units 106C, 106D next to the subset of active transmitter units 106A is the leading transmitter unit 106C and which is the trailing transmitter unit 106D.

Figure 2:
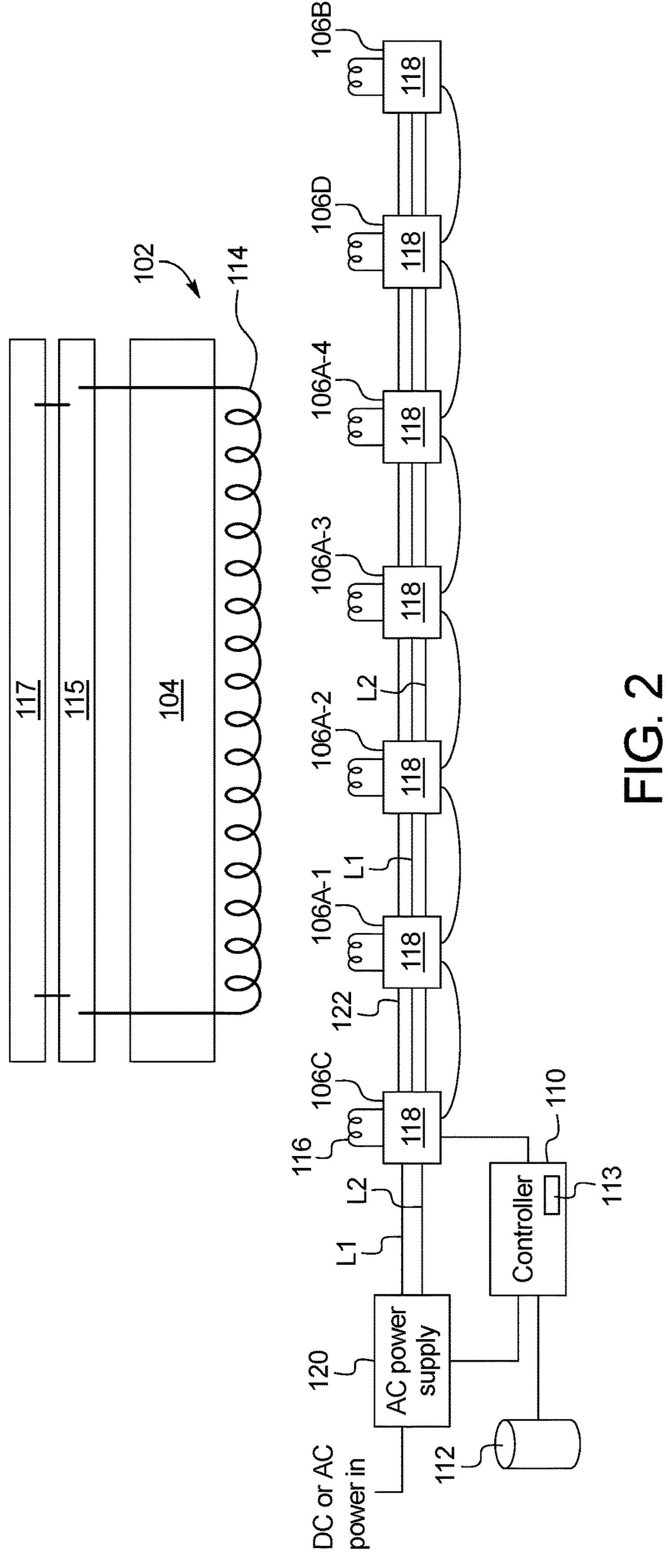
FIG. 2 is a schematic of a communications system of the wireless power transfer system of FIG. 1.
Figure 3:
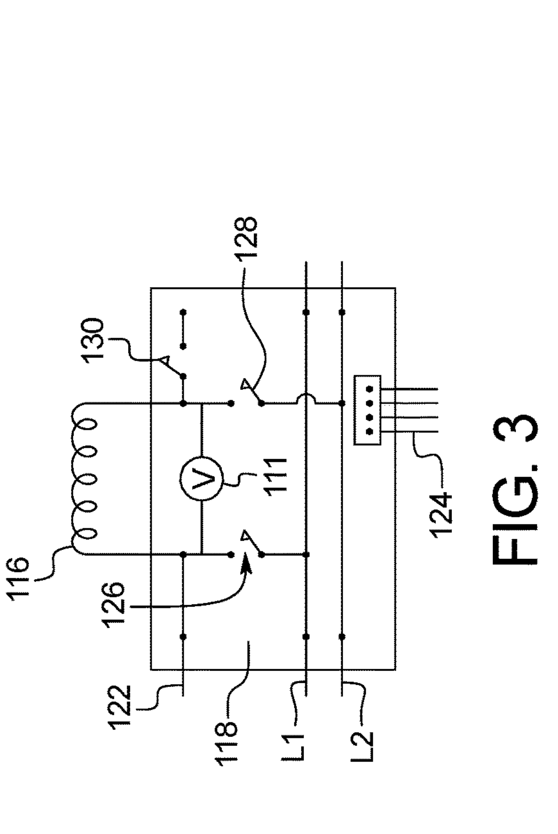
FIG. 3 is a schematic of a transmitter interface module of the communications system of FIG. 2.
Figure 4:
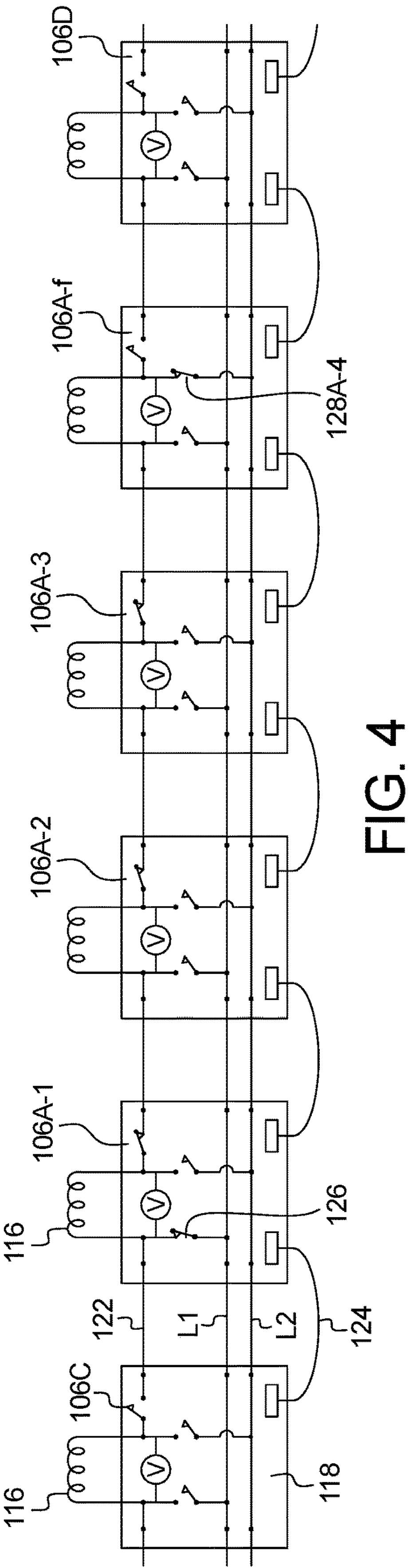
FIG. 4 is a schematic of a set of transmitter interface modules connected in series of the communications system of FIG. 2.

Referring to FIGS. 2-4, the transmitter units 106 are connected in series. The subset of active transmitter units 106A together forms a single virtual coil and the active transmitter units 106A are therefore synchronized. As transmitter units 106 are added and removed from the subset, the single virtual coil effectively moves along the surface 108 with the receiver 102 mounted to the vehicle 102.

As seen in FIG. 2, the receiver 102 includes a receiver coil 114 that is mounted to the underside of the vehicle 104. A resonant tuning network 115 may be utilized to tune the receiver coil 114. The receiver coil 114 is directly or indirectly connected to an energy storage system 117, which receives power transmitted to the receiver coil 114 from the transmitter coils 116. The energy storage system 117 may be a battery, a capacitor, a mechanical flywheel, or other suitable component or load. Each transmitter coil 116 is mounted to a transmitter unit 106, which includes a transmitter interface module 118 having the electrical components to enable operation described herein. The embodiment illustrated in FIG. 2 shows seven transmitter units 106 connected in series, although the number of transmitter units 106 to be connected in series is unlimited.

A high frequency power supply 120 is configured to provide high frequency alternating current (AC) power of at least 20 kH to the transmitter units 106 and the respective transmitter coil 116 through first and second power transmission lines L1, L2. Direct current (DC) or AC power is supplied to the high frequency power supply 120. In one embodiment, laminated plates similar to power electronics bus bar construction provides a lower resistance than typical wire cabling made from multiple round conductors.

In a further embodiment, a second power supply 120 may provide power to the transmitter units 106, which would enable a second subset of active transmitter units 106A to be active separate and apart from the first subset. In this embodiment, the WTP system includes third and fourth power transmission lines L3, L4 running in parallel to the first and second power transmission lines L1, L2. The first and second ends of each transmitter coil 116 may be connected to the third and fourth power transmission lines L3, L4 as an alternative to the first and second power transmission lines L1, L2 through the use of additional switches. During use, a first subset of active transmitter units 106A receives power from the first transmission line L1 and returns power to the second transmission line L2 as described herein. Elsewhere along the path of embedded transmitter units, a second subset of active transmitter units 106A receives power from the third transmission line L3 and returns power to the fourth transmission line L4.

Each transmitter interface module 118 is connected to adjacent transmitter interface modules 118 using a jumper wire 122 or the like. The controller 110 communicates with each transmitter interface module 118 through a communication wire 124 that can be connected through transmitter interface modules 118 in series via a daisy chain or connected directly from the controller 118 to each transmitter interface module 118. The voltage sensor 111 is positioned between the first and second ends of the transmitter coil 116 that is connected to the respective transmitter interface module 118.

The transmitter interface module 118 includes switches to connect and disconnect the power transmission lines L1, L2 and the jumper wire 122 between transmitter units 106 connected in series. Referring to FIG. 3, first and second switches 126, 128 connect the transmitter coil 116 to the power transmission lines L1 and L2, respectively. A third switch 130 connects the jumper wire between adjacent transmitter units 106. Transistors or any mechanical switch may be used for the switches 126, 128, 130.

FIG. 4 illustrates the status of the switches 126, 128, 130 in the subset of active transmitters 106A, the leading transmitter unit 106C, and the trailing transmitter unit 106D. In the first active transmitter unit 106A-1 of the subset, the switch 126A-1 is closed, supplying power from the power transmission line L1 to the transmitter coil 116A-1. The switches 130A-1, 130A-2, 130A-3 are closed, allowing the transmitter coils 116A-1, 116A-2, 116A-3, 116A-4 to connect in series. The switch 128-4 on the last active transmitter unit 106A-4 of the subset is closed, connecting the coil 116A-4 to the power transmission line L2, thereby closing the loop.

All other switches remain open. Switches 126, 128 of active transmitter units 106A-2, 106A-3 remain open so that power passes through the coil 116 and jumper wire 122 to the coil 116 of the adjacent transmitter unit 106. Switch 130 of the last active transmitter unit 106A-4 of the subset is open, preventing power from being transmitted to the trailing transmitter unit 106D.

In other embodiments, the jumper wire 122 of all transmitter units 106 remain connected, and no switches are used to connect or disconnect neighboring transmitter units 106. In this case, each coil 116 of the subset of active transmitter units 106 is connected to both of the first and second power lines L1, L2. The first and second switches remain open on inactive transmitter units 106B and are closed when the transmitter unit 106A is active.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A wireless power transfer system for a vehicle that includes an energy storage system, wherein the vehicle travels along a surface, the wireless power transfer system comprising:

a receiver coil mounted to the vehicle, wherein the receiver coil has a length;

a plurality of transmitter units electrically connected and positioned on or under the surface, each transmitter unit associated with an attached transmitter coil, the plurality of transmitter units including inactive transmitter units and a subset of active transmitter units, the inactive transmitter units including a leading transmitter unit and a trailing transmitter unit adjacent to the subset of active transmitter units, wherein the subset of active transmitter units has a length that is less than the length of the receiver coil, and wherein each transmitter unit includes a voltage sensor connected to the attached transmitter coil; and a controller in communication with the voltage sensor of each transmitter unit;

a database including data related to voltages of transmitter coils;

a memory coupled to the controller, wherein the memory stores program instructions executable by the controller, wherein, in response to executing the program instructions, the controller:

receives a leading voltage of the voltage sensor of the leading transmitter unit;

receive a trailing voltage of the voltage sensor of the trailing transmitter unit;

compare the leading and trailing voltages of the leading and trailing transmitter units with data in the database;

determine a position of the receiver relative to the leading transmitter unit and the trailing transmitter unit;

store or receive, from the database, a minimum threshold voltage differential;

calculate a voltage differential between the leading and trailing voltages of the leading and trailing transmitter units; and when the voltage differential is greater than the minimum threshold voltage differential, activate the leading transmitter unit.

2. The wireless power transfer system of claim 1, wherein the subset of active transmitter units includes a final active transmitter unit adjacent to the trailing transmitter unit, and wherein the controller is configured to deactivate the final active transmitter unit when the voltage differential is greater than the minimum threshold voltage differential.

3. The wireless power transfer system of claim 1, wherein the controller is configured to calculate an absolute value of the voltage differential and compare the absolute value and the minimum threshold voltage differential.

4. The wireless power transfer system of claim 1, wherein a polarity of the voltage differential indicates a direction in which the vehicle is traveling.

5. The wireless power transfer system of claim 1, wherein each transmitter coil is connected to a first power transmission line and a second power transmission line, each transmitter unit is electrically connected in series to an adjacent transmitter unit through a jumper wire, and each transmitter unit includes first and second switches at the connection of first and second ends of the attached transmitter coil to the first and second power transmission lines, respectively, and a third switch on the jumper wire, and wherein the controller is connected to the first, second, and third switches in each transmitter unit.

6. The wireless power transfer system of claim 5, wherein, in each inactive transmitter unit, the first, second, and third switches are open; wherein, in each transmitter unit in the subset of active transmitter units, the third switch is closed.

7. The wireless power transfer system of claim 6, wherein, in the first transmitter unit in the subset of active transmitter units, the first switch is closed and the second switch is open; and wherein, in the last transmitter unit in the subset of active transmitter units, the first switch is open and the second switch is closed.

8. The wireless power transfer system of claim 7, wherein the controller is configured to close the first and third switches in the leading transmitter unit when the voltage differential is greater than the minimum threshold voltage differential.

9. The wireless power transfer system of claim 7, wherein the controller is configured to open the second and third switches in the last transmitter unit in the subset of active transmitter units when the voltage differential is greater than the minimum threshold voltage differential.

10. The wireless power transfer system of claim 1, wherein each transmitter coil is connected to a first power transmission line and a second power transmission line, and each transmitter unit includes first and second switches at the connection of first and second ends, respectively, of the attached transmitter coil to the first and second power transmission lines, respectively, and wherein the controller is connected to the first and second switches in each transmitter unit.

11. The wireless power transfer system of claim 10, wherein, in each inactive transmitter unit, the first and second switches are open; wherein, in each transmitter unit in the subset of active transmitter units, the first and second switches are closed.

12. The wireless power transfer system of claim 11, wherein the controller is configured to close the first and second switches in the leading transmitter unit when the voltage differential is greater than the minimum threshold voltage differential.

13. The wireless power transfer system of claim 11, wherein the controller is configured to open the first and second switches in the last transmitter unit in the subset of active transmitter units when the voltage differential is greater than the minimum threshold voltage differential.

14. The wireless power transfer system of claim 1, wherein the controller is configured to:

store or receive from the database a minimum threshold voltage value;

when the leading voltage of the leading transmitter unit is greater than the minimum threshold voltage value, activate the leading transmitter; and when the trailing voltage of the trailing transmitter unit is less than the minimum threshold voltage value, deactivate the trailing transmitter unit.

15. The wireless power transfer system of claim 1, wherein the data on the database includes a plurality of voltages, each corresponding to a surface area of the transmitter coil covered by the receiver coil, and wherein the controller is configured to:

compare the leading voltage with the plurality of voltages in the database to determine a surface area of the leading transmitter unit covered by the receiver coil; and compare the trailing voltage with the plurality of voltages in the database to determine a surface area of the trailing transmitter unit covered by the receiver coil.

16. The wireless power transfer system of claim 15, wherein the controller is configured to:

monitor a voltage rise in the leading transmitter unit;

monitor a voltage drop in the trailing transmitter unit;

determine a velocity of the receiver based on the voltage rise and the voltage drop.

17. The wireless power transfer system of claim 16, wherein the controller is configured to:

store or receive a minimum threshold voltage value;

determine an amount of time until the leading voltage of the leading transmitter unit will reach the minimum threshold voltage value; and determine an amount of time until the trailing voltage of the trailing transmitter unit will reach the minimum threshold voltage value.

18. The wireless power transfer system of claim 1, wherein at least one of the plurality of transmitter units is flush with or embedded in the surface.

* * * * *